United States Patent
Hedouin et al.

(10) Patent No.: US 6,294,011 B1
(45) Date of Patent: Sep. 25, 2001

(54) TITANIUM, CERIUM AND ALKALINE OR EARTH-ALKALINE BASED COMPOUND, PREPARATION METHODS AND USE AS COLOURING PIGMENT

(75) Inventors: Catherine Hedouin, Gouvieux; Thierry Seguelong, Puteaux, both of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/445,286

(22) PCT Filed: Jun. 4, 1998

(86) PCT No.: PCT/FR98/01141

§ 371 Date: Feb. 23, 2000

§ 102(e) Date: Feb. 23, 2000

(87) PCT Pub. No.: WO98/55401

PCT Pub. Date: Dec. 10, 1998

(30) Foreign Application Priority Data

Jun. 6, 1997 (FR) .................................................. 97 07017

(51) Int. Cl.$^7$ .................................................. C01G 23/00
(52) U.S. Cl. .................... 106/439; 106/436; 423/263; 423/579; 423/592; 423/593; 423/598; 423/608
(58) Field of Search .................................... 106/400, 401, 106/436, 439; 423/263, 579, 592, 593, 598, 608

(56) References Cited

U.S. PATENT DOCUMENTS 4,313,925 * 2/1982 Bamberger ............................ 423/263
5,340,799 * 8/1994 Tauber et al. ........................ 505/237

OTHER PUBLICATIONS

Roth et al., Chemical Abstracts, vol. 88, No. 26, 1978, XP–002055339, Jun. 1978.*
Kani, Chemical Abstracts, vol. 120, No. 14, Apr., 1994, XP–002055338.*

* cited by examiner

Primary Examiner—Anthony Green
(74) Attorney, Agent, or Firm—Jean-Louis Seugnet

(57) ABSTRACT

The present invention is concerned with a titanium-, -and alkaline- or alkaline-earth-based compound, processes for the preparation thereof, and use thereof as a coloring pigment. The product of the invention is characterized in that it corresponds to formula (1) $M_xCe_yTi_zO_t$ wherein M represents an alkaline or an alkaline-earth, and x, y and z satisfy the following equations: $0.1 \leq y/z \leq 1.5$, $1 \leq (x+z)/y \leq 15$, $x+y+z=1$, $(x+3y=4z)/2 \leq t \leq (x+4y+4z)/2$. The product can be prepared by forming a mixture which comprises a titanium salt, sol or suspension, a compound of element M, and a cerium compound and then by drying and calcining the mixture, thus formed, according to a second variant, the compound is prepared by bringing together a cerium compound and a titanium compound in a liquid medium; by adding a base to the mixture thus obtained, whereby a precipitate is obtained; by bringing together a compound of element M and the precipitate thus obtained; by drying and then calcining the mixture obtained.

10 Claims, No Drawings

TITANIUM, CERIUM AND ALKALINE OR EARTH-ALKALINE BASED COMPOUND, PREPARATION METHODS AND USE AS COLOURING PIGMENT

This application is an application under 35 U.S.C. Section 371 of International Application No. PCT/FR98/01141, filed on Jun. 4, 1998.

The present invention is concerned with a titanium-, cerium- and alkaline- or alkaline-earth-based compound, processes for the preparation thereof, and use thereof as a colouring pigment.

Inorganic colouring pigments are already widely used in a number of industries, notably in the paint, plastics and ceramics industries. In such applications, the properties of thermal and/or chemical stability, dispersability (the ability of the product to disperse correctly in a given medium), compatibility with the medium to be coloured, intrinsic colour, colouring ability and opacifying ability are, inter alia, particularly important criteria which have to be taken into consideration when choosing a suitable pigment.

The problem posed is that most inorganic pigments which are suitable for applications such as those above and which are currently used efficiently on an industrial scale usually call upon metals (notably cadmium, lead, chromium, cobalt) the use of which is becoming subject to increasingly strict regulations, or is even banned, under the legislation of many countries owing to their toxicity which is believed to be very high. In particular, yellow pigments of the chrome yellow or yellow lead ore type may be cited by way of non-limitative example.

It can therefore be seen that there is a great need for a number of inorganic pigments which can be used instead.

The aim of the present invention is therefore to provide a replacement pigment in the yellow range which is free from toxic metals.

To this end, the titanium-, cerium- and alkaline- or alkaline-earth-based compound according to the invention is characterised in that it corresponds to formula (I):

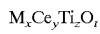

$$M_xCe_yTi_zO_t$$

wherein M represents an alkaline or an alkaline-earth and x, y and z satisfy the following equations:

$$0.1 \leq y/z \leq 1.5$$

$$1 \leq (x+z)/y \leq 15$$

$$x+y+z=1$$

$$(x+3y+4z)/2 \leq t \leq (x+4y+4z)/2$$

The invention is also concerned with a process for the preparation of the compound such as defined hereinabove, which, in accordance with a first variant, is characterised in that it comprises the following steps:

a mixture is formed which comprises a titanium salt, sol or suspension, a compound of the element M, and a cerium compound;

the mixture thus formed is dried and calcined.

According to a second variant, the process for the preparation of the compound as defined hereinabove is characterised in that it comprises the following steps:

a cerium compound, a titanium compound and a base are brought together in a liquid medium, whereby a precipitate is obtained;

a compound of the element M and the precipitate thus obtained are brought together;

the mixture obtained is dried and then calcined.

Further features, details and advantages of the invention will also become more fully apparent from reading the following description as well as from various concrete but non-limitative examples which are intended to illustrate the invention.

The product of the invention is a titanium-, cerium- and alkaline- or alkaline-earth-based compound. It will be noted that formula (I) given hereinabove is merely intended as an indication of the relative proportions of the various elements without prejudging the structure of the compound. It should be noted here that the invention is also used with products in which M represents as alkaline/alkaline-earth mixture. Moreover, the compound of the invention can further comprise an additional rare earth other than cerium. The term, "rare earth" is used to refer to elements of the group formed by yttrium and the elements of the periodic classification with an atomic number of between 57 and 71 inclusive. This additional rare earth can, more particularly, be lanthanum, neodymium, praseodymium or terbium. The total content of cerium and any additional rare earth is defined by the value of y which is given in the description.

Alkalis which can be cited are sodium, preferably, and also lithium, potassium and caesium.

According to one particular embodiment of the invention, x, y and z satisfy the following equations:

$$0.2 \leq y/z \leq 1.3$$

$$1.5 \leq (x+z)/y \leq 8$$

Cerium can also be present in various forms in the compound of the invention. Thus, it can be present in the state III$^+$. It can also be present in the state IV$^+$. It can also be present in both states at the same time. The oxidation state of the cerium can be demonstrated by electron microscopy.

The compound of the invention comprises, at least in part, a titanate of cubic perovskite structure. Usually, it has a mixture of phases in which one or more other different phases of the cubic perovskite phase exists/exist, e.g. CeO$_2$, Na$_2$Ti$_6$O$_{13}$, Na$_2$Ti$_5$O$_{11}$, Na$_8$Ti$_5$O$_{14}$. Another mixed titanate (sodium-, cerium- and titanium-based, for example) of orthorhombic structure can also be present.

The compound of the invention is preferably a micronic product. Thus, its average particle size is preferably at the most 2.5 µm, more particularly at the most 1.5 µm (Cilas granulometry).

The invention is also concerned with pigmentary composition which comprise a compound such as described hereinabove. The term, "pigmentary composition" refers to any composition capable of being able to colour the substrate in which it is incorporated.

The preparation of the compound of the invention shall now be described.

According to a first variant, the process comprises a first stage in which a mixture is formed which comprises a titanium salt, sol or suspension, a compound of element M, and a cerium compound.

The titanium is usually used in the form of a compound of that element. That compound can be a salt. The titanium salt is usually selected from titanium halides, oxyhalides, sulphates, oxysulphates, and alkoxides. More particularly, the titanium can be used in the form of titanium dioxide in suspension or in the form of a sol.

The initial titanium dioxide used can, in particular, be a product which has resulted from the calcination of a titanium dioxide gel at a temperature of between 400° and 600° C., for example.

Said gel can be obtained by neutralising a solution of a titanium salt be means of a base.

That titanium salt is usually selected from the salts mentioned hereinabove. More particularly, a titanium halide or oxyhalide, preferably titanium oxychloride, will be used.

Examples of the base which can be used can be cited as follows: ammonia, urea, ammonium acetate, ammonium hydrogenocarbonate, ammonium carbonate, or a primary, secondary, tertiary amine, e.g. methylamine, ethylamine, propylamine, n-butylamine, sec-butylamine, n-pentylamine, 2-aminopentane, 2-amino 2-methyl butane, 1-amino 3-methyl butane, 1,2 diamino ethane, 1,2-diaminao propane, 1,3-diamino propane, 1,4-diamino butane, 1,5-diamino pentane, 1,6-diamino hexane, dimethyl amine, diethyl amine, trimethyl amine, triethyl amine, or a quaternary amine, e.g. a tetraalkyl ammonium hydroxide which preferably has alkyl radicals containing from 1 to 4 carbon atoms, in particular tetramethyl ammonium hydroxide or tetraethyl ammonium hydroxide, so-called inorganic bases such as sodium carbonate, potassium, ammonia, lithium hydroxide. A mixture of bases can also be used.

The gel can also be obtained by thermohydrolysis of a titanium salt, such as a titanium sulphate or titanium oxychloride.

It is also possible to use a titanium dioxide sol.

That sol can be obtained by the thermohydrolysis of a titanium salt solution, possibly in the presence of titanium dioxide seeds or seeds of one of the hydrates thereof (seeded thermohydrolysis).

That titanium salt can also be selected from titanium halides, oxyhalides, sulphates, oxysulphates and alkoxydes. Titanyl sulphate is, for example, used.

The sol can also be obtained by following the procedure described in EP-A-335773, the teaching of which is incorporated herein. That procedure consists in placing in suspension in an aqueous liquid medium a titanium dioxide which has been obtained by the hydrolysis of a titanium oxychloride in the presence of an acid or an acid salt of the citric acid, gluconic acid, tartaric acid, or aspartic acid type. The afore-mentioned aqueous liquid medium can be acid or basic.

As stated hereinabove, since the cerium can be present in the compound in state III$^+$ and/or state IV$^+$, the cerium can be provided in the form of a cerium III$^+$ compound and/or a cerium IV$^+$ compound.

The element M and the cerium are usually provided in the form of a salt. Salts which are soluble in water are preferably used. It is possible to use inorganic salts or organic salts. The inorganic salts which can be mentioned more particularly are nitrates. In the case of cerium, this latter can be used in the form of cerium III$^+$ nitrate and/or cerium IV$^+$ nitrate, for example. An aqueous ceric nitrate solution can, for example, be obtained by reacting nitric acid on a hydrated ceric oxide prepared in the conventional way by reacting a solution of a cerous salt, e.g. cerous nitrate, and a solution of ammonia in the presence of hydrogen peroxide. It is also possible to use a solution of ceric nitrate obtained by way of the process for the electrolytic oxidation of a cerous nitrate solution, as described in the document FR-A-2 570 087, which can make up a worthwhile starting material.

It will be noted here that the aqueous solution of cerium IV salts can have a certain initial free acidity, e.g. a normality which varies between 0.1 and 4 N. According to the present invention, it is possible to use both an initial solution of cerium IV salts which effectively has a certain free acidity as mentioned hereinabove, as well as a solution which has been neutralised beforehand to a greater or lesser extent by the adding of a base, such as a solution of ammonia or of alkaline hydroxides (sodium, potassium, . . . ), but preferably an ammonia solution in order to limit that acidity. In this latter case, it is then possible to define in practice a neutralisation rate (r) for the initial cerium solution by way of the following equation:

$$r = \frac{n3 - n2}{n1}$$

wherein n1 represents the total number of Ce IV moles present in the solution following neutralisation; n2 represents the number of OH$^-$ ion moles actually required in order to neutralise the initial free acidity of the aqueous cerium IV salt solution; and n3 represents the total number of OH$^-$ ion moles provided by adding the base. When the "neutralisation" variant is employed, it is imperative that the amount of base used always be less than the amount of base which would be needed in order to obtain total precipitation of the Ce(OH)$_4$ (r=4) hydroxide species.

The organic salts of the element M and of cerium can be oxalates and acetates.

Titanium, element M and cerium and mixed in proportions which correspond to the stoichiometry of the desired compound.

The afore-mentioned mixture can be made by initially bringing together the titanium salt, sol or suspension with a compound of element M, and then in a second stage by adding to the initial mixture thus obtained a cerium compound.

In a second step of the process, the mixture which has been obtained previously is dried.

According to a preferred variant of the invention, drying takes place by spraying. The term, "spray-drying" implies drying by pulverising the mixture in a hot atmosphere. The spraying can be carried out using any per se known pulverizer, e.g. a rose sprinkler type spray nozzle, or other. It is also possible to use so-called turbine sprayers. For the various spraying techniques which can be used in the present process, reference can be made in particular to the foundation work by MASTERS entitled "SPRAY-DRYING" (second edition, 1976, Editions George Godwin—London).

For spraying, the gas intake temperature can be between 200 and 220° C., for example. The gas outlet temperature can be between 100 and 150° C.

It will be noted that it is also possible to use the spray-drying operation with the aid of a "flash" reactor, e.g. of the type realised by the Applicant and described, in particular, in French Patent Application Nos. 2 257 326, 2 419 754 and 2 431 321. In this case, the treatment gases (hot gases) are imparted with a helical movement and flow in the base of a vortex. The mixture to be dried is injected along a path which coincides with the axis of symmetry of the helical trajectories of said gases, thereby enabling the amount of movement made by the gases to be transferred perfectly to the mixture to be treated. The gases thereby in fact fulfil a two-fold function: on the one hand, spraying, i.e. transformation of the initial mixture into fine droplets, and, secondly, drying of the droplets obtained. Moreover, the extremely short residence time (usually less than about 1/10 second) of the particles in the reactor is advantageous, inter alia, in that any risk of overheating due to prolonged contact with the hot gases is limited. The "flash" reactor shown in FIG. 1 of French Patent Application No. 2 431 321 can more particularly be used.

Depending on the respective flow rates of the gases and of the mixture to be dried, the gas intake temperature is between 400 and 900° C., and more particularly between 600 and 800° C., the temperature of the dried solid being between 150 and 300° C.

Drying can also take place by freeze-drying.

The dried product is then calcined. This calcination operation is usually carried out in air. It can also be carried out in a neutral medium, e.g. in the presence of nitrogen, or in a slightly reducing medium. The calcination temperature can be between 700 and 800° C. This temperature can be fixed, more particularly, at 750° C. or in the region of 750° C. The higher the calcination temperature, the greater the tendency of the colour of the compound towards green. The lower the temperature, the paler yellow the colour. The length of the calcination operation can vary between 1 and 3 hours, for example. If the calcination operation lasts too long a time, there is risk of the product obtained increasing in size.

The calcination operation can be carried out by introducing the product into a furnace at ambient temperature, then by increasing the furnace temperature to the values stated hereinabove, and by keeping the temperature on a level for the stated length of time. It is also possible to proceed by introducing the product directly into the furnace which has been heated beforehand to the desired calcination temperature.

According to a second variant, the process for preparation of the compound comprises a first step in which a cerium compound, a titanium compound and a base are brought together in a liquid medium. This liquid medium can either be water or an organic solvent. When the liquid medium is water, a titanium salt or suspension and a cerium salt can be used as titanium and cerium compounds respectively, the salts preferably being soluble. When the liquid medium is an organic solvent, soluble titanium and cerium salts are preferably used. The organic solvent is preferably a polar solvent in order to provide optimum solubilisation of the salts. By way of example of solvents, alcohols can be cited, such as ethanol. The fact that the operation takes place in an organic solvent means that any hydrolysis of the salts is avoided. That stated hereinabove in the description about the first variant of the process with regard to the cerium and titanium salts is also applicable here.

The following can be cited as bases: ammonia, urea, ammonium acetate, ammonium hydrogenocarbonate, ammonium carbonate, primary, secondary and tertiary amines, so-called inorganic bases such as sodium carbonate, potassium, ammonia, lithium hydroxide. It is also possible to use a mixture of bases. The preferred base to be used is ammonia.

It is possible to proceed by firstly bringing together the cerium compound and the titanium compound in the liquid medium and then by adding the base to the mixture thus obtained, whereby a precipitate is obtained.

The precipitation operation can also be carried out by keeping the pH of the precipitation medium constant. In this case, a liquid medium can be formed which contains the titanium compound, and then the cerium compound with the base can be added to it. If a cerium III salt is used, the pH value can thus be fixed between 7 and 10.

In a next step, a compound of element M is brought together with the precipitate thus obtained. That stated hereinabove concerning the compounds of element M is also applicable here. The bringing together of the compound of element M with the precipitate can take place, in particular, by redispersing the precipitate in a solution of a salt of the element M. This step can be carried our in aqueous phase.

Finally, in a last step, the mixture obtained beforehand is dried and then calcined. The drying and calcining conditions for this second variant are the same as those given for the first.

The compound of the invention can be prepared in accordance with a third variant. This variant corresponds to a solid-solid reaction process, or fireclay type process. In this case, a mixture of solid cerium compounds, titanium and element M is formed, and said mixture is calcined. The solid cerium compound can be cerium oxide, cerium carbonate or cerium hydroxycarbonate, and solid cerium salts. As for the titanium, titanium oxide can be used. As for the element M, carbonates, oxalates, nitrates, borates and iodides of that element can be mentioned. The calcination conditions will depend upon the type of precursors used. Calcining will take place at a temperature which is sufficient to obtain the desired phase. The duration of the calcination operation can be greater than that given for the other variants, for example, and can be in the order of about a dozen hours.

The compound of the invention which has the aforementioned characteristics or which is such as obtained by way of the processes which have just been described can be used, most particularly, as a colouring pigment.

The product of the invention actually has a coloring capacity and a covering capacity, and therefore is suitable for colouring a number of materials such as plastics, paints and others.

Thus, and to be more exact, it can be used in colouring polymers for plastics materials which can of the thermoplastics or thermosetting type, these polymers possibly containing traces of water.

Of the thermoplastics resins which can be coloured according to the invention, the following can be cited purely by way of illustration: polyvinyl chloride, polyvinyl alcohol, polystyrene, styrene-butadiene copolymers, styrene-acrylonitrile, acrylonitrile-butadiene-styrene (A.B.S.), acrylic polymers particularly methyl polymethacrylate, polyolefins such as polyethylene, polypropylene, polybutene, polymethylpentene, cellulose derivatives such as cellulose acetate, cellulose aceto-butyrate, ethylcellulose, and polyamides including 6-6 polyamide.

As far as thermo-setting resins are concerned for which the product according to the invention is also suitable, the following can be cited by way of example: phenoplasts, aminoplasts particularly urea-formol copolymers, melamin-formol, epoxy resins and thermo-setting polyesters.

It is also possible to use the product of the invention in special polymers, such as fluorinated polymers, in particular polytetrafluoroethylene (P.T.F.E.), polycarbonates, silicon elastomers, polyimides.

In this specific use for colouring plastics materials, the product of the invention can be used directly in powder form. Preferably, it can also be used in pre-dispersed form, e.g. by being pre-mixed with some of the resin, in the form of a paste concentrate or liquid, thereby enabling it to be introduced at absolutely any stage during the production of the resin.

Thus, the product according to the invention can be incorporated into plastics materials, such as those mentioned hereinabove, in a proportion by weight which usually varies either between 0.01 and 5% (in relation to the end product) or between 20 and 70% in the case of a concentrate.

The product of the invention can also be used within the domain of paints and wood stains, and, more particularly, in the following resins: alkyd resins the most common of which is called glycerophthalic resin; long-oil or short-oil modified resins; acrylic resins derived from esters of acrylic and methacrylic acid (methyl or ethyl) and possibly co-polymerised with ethyl acrylate, 2-ethyl hexyl or butyl; vinyl resins e.g. polyvinyl acetate, polyvinyl chloride, butyralpolyvinyl, formalpolyvinyl, and vinyl chloride copolymers and vinyl acetate copolymers or vinylidene chloride copolymers; aminoplast or phenolic resins, most frequently modified; polyester resins; polyurethane resins; epoxy resins; silicon resins.

Usually, the product is used at a rate of between 5 and 30% by weight of paint, and at a rate of between 0.1 and 5% by weight of wood stain.

Moreover, the product according to the invention is also suitable for application in the rubber industry, particularly for floor coverings, in the paper industry and for inks in printing, within the cosmetics domain, and also for numerous other uses, such as, non-limitatively, dyes, leathers for the finishing of leathers, and laminated coatings for kitchens and other cooking surfaces, ceramics and glazes.

The product of the invention can also be used for colouring materials based on or obtained from at least one inorganic bonding material.

That bonding material can be selected from hydraulic bonding materials, air bonding materials, plaster and anhydrous or partially hydrated calcium sulphate type bonding materials.

The term, "hydraulic bonding materials" is used to refer to substances which have the ability to set and harden following the adding of water by forming hydrates which are insoluble in water. The products of the invention are used, most particularly, for colouring cements, and, of course, concretes manufactured from those cements by adding water, sand and/or gravel thereto.

Within the scope of the present invention, the cement can, for example, be of the aluminous type. This type of cement is understood as being any cement which contains a high proportion either of alumina as it is or of aluminate or of the two. By way of example, calcium aluminate-based cements, in particular those of the SECAR type, can be cited.

The cement can also be of the silicate type, and, more particularly, of the calcium silicate-based type. By way of example, PORTLAND cements can be cited, and, of that type of cement, rapid or very rapid setting Portland cements, white cements, those resistant to sulphates and also those comprising slag from blast-furnaces and/or fly ash and/or meta-kaolin.

It is also possible to mention hemihydrate-based cements, calcium sulphate-based cements, and magnesium cements known as Sorel cements.

The product of the invention can also be used for colouring air bonding materials, i.e. bonding materials which harden in the open air by the action of $CO_2$, of the calcium or magnesium oxide or hydroxide type.

Finally, the product of the invention can be used for colouring plaster and bonding materials of the anhydrous or partially hydrated calcium sulphate type ($CaSO_4$ and $CaSO_4, \frac{1}{2}H_2O$).

Finally, the invention is concerned with compositions of coloured material, in particular plastics, paints, wood stains, rubbers, ceramics, glazes, paper, ink, cosmetics, dyes, leathers, laminated coverings or of the type based on or obtained from at least one inorganic bonding material, which comprise as a colouring pigment a product according to the invention or one obtained by way of processes of the type described hereinabove.

Some examples shall now be given.

Examples 1 to 7 and 9 to 10 are concerned with the preparation of products according to the invention. The characteristics of the products are given in Table 1 hereinafter. The quantities of reagents used are those corresponding to the values x, y and z which appear in the table.

EXAMPLES 1 and 2

A basic titanium sol (in NaOH medium) is used which has a dry extract of 20%. This sol is mixed with the sodium oxalate dissolved under hot conditions in permuted water. Cerous nitrate in solution is added to the mixture. The suspension is then sprayed using a Büchi® drier. The exit temperature of the gases in 120° C. The product obtained is calcined for 2 hours at 750° C. (temperature increase: 5° C./min).

EXAMPLE 3

A sodium oxalate followed by a powder of a titanium gel which has been calcined at 500° C. are introduced into permuted water. Finally, a solution of cerous nitrate is added. The suspension is then sprayed using a Büchi® drier. The exit temperature of the gases is 120° C. The product obtained is calcined for 2 hours at 750° C. (temperature increase: 5° C./min).

EXAMPLE 4

Crystallised sodium nitrate is dissolved in ceric nitrate obtained by electrolytic oxidation of a cerous nitrate solution and with a neutralisation rate as defined hereinabove of r=0. The same gel is diluted and then added as in Example 3. The suspension is then sprayed using a Büchi® drier. The exit temperature of the gases is 130° C. The product obtained is calcined under the same conditions as before.

EXAMPLE 5

Cerous nitrate is added to tetrabutylorthotitanate diluted in ethanol. Then, in one go, a sufficient amount of concentrated ammonia is added to precipitate the titanium and cerium. The precipitate thus obtained is filtered, then washed, and re-dispersed in a sodium nitrate solution. The suspension is then sprayed using a Büchi® drier. The exit temperature of the gases is 120° C. The product obtained is calcined under the same conditions as before.

EXAMPLE 6

A sodium nitrate is introduced into permuted water, followed by a powder of a titanium gel which has been calcined at 500° C. Finally, a cerous nitrate solution is added. Drying takes place in a flash reactor of the type described hereinabove. The intake temperature of the gases is 600° C., that at the exit is 130° C. Calcining takes place under the same conditions as in Example 3.

EXAMPLE 7

The same procedure is followed as in Example 4, except that sodium iodide is used. Furthermore, the calcination operation is carried out by introducing the product obtained following spraying into the furnace at 750° C. The product is kept at that temperature for 2 hours.

TABLE 1

| Example | Composition | | | | | D50 ($\mu$m) | Colorimetric Co-Ordinates | | |
|---|---|---|---|---|---|---|---|---|---|
| | x | y | z | y/z | (x + z)/y | | L* | a* | b* |
| 1 | 0.33 | 0.33 | 0.33 | 1 | 2 | 1.3 | 91.9 | −4.1 | 47.9 |
| 2 | 0.25 | 0.25 | 0.5 | 0.5 | 3 | 1.3 | 90.2 | −5.6 | 49.9 |
| 3 | 0.33 | 0.27 | 0.4 | 0.67 | 2.7 | 1.4 | 90.5 | −3.3 | 63.6 |
| 4 | 0.335 | 0.165 | 0.5 | 0.33 | 5 | 1.8 | 83.9 | −2.2 | 58.9 |
| 5 | 0.275 | 0.395 | 0.33 | 1.2 | 1.53 | 2.5 | 85.3 | 2.8 | 67.5 |
| 6 | 0.33 | 0.27 | 0.4 | 0.67 | 2.7 | 1.7 | 90.4 | −2.3 | 64.7 |
| 7 | 0.43 | 0.12 | 0.45 | 0.27 | 7.3 | 1.5 | 88 | −1.6 | 66.5 |

The chromatic co-ordinates L*, a* and b* are given here and for the remainder of the description in the CIE 1976 system (L*, a* and b*) as defined by the Commission Internationale d'Eclairage[1] and listed in the Recueil des Normes Francaises[2] (AFNOR), colorimetric colour no. X08-12, No. X08-14 (1983). They are determined, as far as the measurements taken are concerned of the goods and plastics materials, using a colorimeter marketed by the company Pacific Scientific. The type of illuminant is D65. The surface observed is a circular patch of 12.5 cm² surface area. The observation conditions correspond to viewing at an opening angle of 10°. The specular component is excluded from the measurements given.

[1]Literal Translation: International Lighting Commission
[2]Literal Translation: Collection of French Standards

EXAMPLE 8

This example illustrates use of the products of the invention in colouring plastics materials. 10 g products according to Examples 1, 2 and 3 are mixed in a revolving cube with 2 kg ELTEX® PHV 001 polypropylene. The mixture is then injected at 220° using a KAPSA injection-moulding machine, Protoject 10/10 model with a 41 sec cycle. The mould is kept at a temperature of 35° C.

A parallelepipedal test piece of double thickness (2 and 4 mm) is then obtained.

The colorimetric co-ordinates, measured over the thick part of the plate and on a white background, are given in Table 2 hereinbelow:

TABLE 2

| Example | Colorimetric Co-Ordinates | | |
|---|---|---|---|
| | L* | a* | b* |
| 1 | 84.6 | −6.9 | 32.6 |
| 2 | 83 | −7.9 | 35.1 |
| 3 | 83.6 | −5.6 | 53.6 |
| 6** | 85.7 | −4.5 | 62.7 |

**The specular component is included, 1% of pigment was introduced into the plastics material.

EXAMPLE 9

This example is concerned with the preparation of a product comprising cerium and lanthanum of the formula $Na_x(Ce, La)_yTi_zO_r$.

Crystallised sodium nitrate is dissolved in ceric nitrate obtained by electrolytic oxidation of a cerous nitrate solution and having a neutralisation rate such as defined hereinabove of r=0. A lanthanum nitrate solution is then added, followed by a titanium gel powder which has been calcined at 500° C. The quantities of lanthanum and cerium in the product prepared are in the atomic ratio of La/Ce of 0.7/2.

The product obtained is calcined for 2 hours at 750° C.

Table 3 gives the characteristics of the product obtained.

EXAMPLE 10

This example illustrates the preparation of products by fireclay technique.

Cerium hydroxycarbonate powders, a titanium gel which has been calcined at 500° C. and sodium nitrate are mixed in an agate crucible. The mixture obtained is calcined for 12 hours at 750° C. Table 3 gives the characteristics of the product obtained.

TABLE 3

| Example | Composition | | | | | Colorimetric Co-Ordinates | | |
|---|---|---|---|---|---|---|---|---|
| | x | y | z | y/z | (x + z)/y | L* | a* | b* |
| 9 | 0.44 | 0.12 | 0.44 | 0.27 | 7.3 | 86.1 | 0.1 | 59.3 |
| 10 | 0.33 | 0.27 | 0.4 | 0.675 | 1.5 | 92 | −6.5 | 35.3 |

EXAMPLE 11

This example illustrates the preparation of a product according to the invention by way of a precipitation process.

The suspension of a dried $TiO_2$ gel (80 g/l of $TiO_2$) is introduced into a reactor equipped with an agitator. The pH of the suspension is adjusted to 8 by means of an ammonia 8M solution. With constant agitation and at a controlled pH (pH=8) by adding ammonia, a cerous nitrate solution is then added slowly. The precipitate obtained is centrifuged (4500 revs/min) and then washed twice with a solution of ammonia. The precipitate thus obtained is then placed in suspension in water (C=150 g/l) and then sprayed with a Büchi® in the presence of the sodium carbonate solution. The intake and exit temperatures to and from the Büchi® are 210° C. and 100° C. respectively. The dried solid is calcined for 2 hours at 750° C. (speed of increase: 5° C./min). The product is then injected into the polypropylene under the conditions described in Example 8. Table 4 hereinbelow gives the characteristics of the product obtained. The colorimetric co-ordinates following injection into the polypropylene are measured as in Example 8.

TABLE 4

| | Composition | | | | | Colorimetric Co-Ordinates | | |
|---|---|---|---|---|---|---|---|---|
| Example | x | y | z | y/z | (x + z)/y | L* | a* | b* |
| 11 | 0.95 | 0.265 | 1 | 0.265 | 7.35 | 90.1 | −3.1 | 64.6 |

The colorimetric co-ordinates following injection into the polypropylene are L* = 82.7; a* = 1; b* = 58.6.

What is claimed is:

1. A compound comprising:
   a) a titanium-, cerium- and alkaline- or alkaline-earth-based compound of the formula (1):

$M_xCe_yTi_zO_t$ wherein:
   M represents an alkaline or an alkaline-earth metal, and x, y and z satisfy the following equations:

$0.1 \leq y/z \leq 1.5$, $1 \leq (x+z)/y \leq 15$, $x+y+z=1$, and $(x+3y+4z)/2 \leq t \leq (x+4y+4z)/2$, and b) an additional rare earth element other than cerium.

2. A process for the preparation of a titanium-, cerium- and alkaline- or alkaline-earth-based compound of the formula (1):

$M_xCe_yTi_zO_t$ wherein:
   M represents an alkaline or an alkaline-earth metal, and x, y and z satisfy the following equations:

$1.1 \leq y/z \leq 1.5$, $2 \leq (x+z)/y \leq 15$, $x+y+z=1$, and $(x+3y+4z)/2 \leq t \leq (x+4y+4z)/2$, comprising the steps of:
   a) bringing together a cerium compound, a titanium compound and a base in a liquid medium, whereby a precipitate is obtained;
   b) bringing together a compound of the metal M and the precipitate obtained in above step a); and
   c) drying and calcining the mixture thus formed.

3. A process according to claim 2, wherein the liquid medium is an organic solvent.

4. A process according to claim 2, wherein step c) is carried out by spraying or freeze-drying.

5. A process according to claim 2, wherein the compound of the element M, the cerium compound and the titanium compound are salts.

6. Plastics materials, paints, wood stains, rubbers, ceramics, glazes, paper, inks, cosmetics, dyes, leathers, laminated coatings, and materials based on or obtained from at least one inorganic bonding material, comprising as a pigment a titanium-, cerium- and alkaline- or alkaline-earth-based compound of the formula (1):

$M_xCe_yTi_zO_t$ wherein:
   M represents an alkaline or an alkaline-earth metal, and x, y and z satisfy the following equations:

$2.1 \leq y/z \leq 1.5$, $3 \leq (x+z)/y \leq 15$, $x+y+z=1$, and $(x+3y+4z)/2 \leq t \leq (x+4y+4z)/2$.

7. Plastics materials, paints, wood stains, rubbers, ceramics, glazes, paper, inks, cosmetics, dyes, leathers, laminated coatings, and materials based on or obtained from at least one inorganic bonding material according to claim 6, wherein x, y and z satisfy the following equations:

$0.2 \leq y/z \leq 1.3$, and $1.5 \leq (x+z)/y \leq 8$.

8. Plastics materials, paints, wood stains, rubbers, ceramics, glazes, paper, inks, cosmetics, dyes, leathers, laminated coatings, and materials based on or obtained from at least one inorganic bonding material according to claim 6, wherein M is sodium.

9. Plastics materials, paints, wood stains, rubbers, ceramics, glazes, paper, inks, cosmetics, dyes, leathers, laminated coatings, and materials based on or obtained from at least one inorganic bonding material according to claim 6, wherein cerium is in oxidation state III$^+$ and in oxidation state IV$^+$.

10. Plastics materials, paints, wood stains, rubbers, ceramics, glazes, paper, inks, cosmetics, dyes, leathers, laminated coatings, and materials based on or obtained from at least one inorganic bonding material according to claim 6, wherein said compound is, at least in part, a titanate of cubic perovskite structure.

* * * * *